United States Patent [19]

Brandolf

[11] Patent Number: 6,009,610

[45] Date of Patent: *Jan. 4, 2000

[54] RE-ENTERABLE CONDUIT SEALING ASSEMBLY AND METHOD

[76] Inventor: Henry E. Brandolf, 129 Croyden Dr., Kernersville, N.C. 27284

[*] Notice: This patent issued on a continued prosecution application filed under 37 CFR 1.53(d), and is subject to the twenty year patent term provisions of 35 U.S.C. 154(a)(2).

[21] Appl. No.: 08/780,451

[22] Filed: Jan. 8, 1997

Related U.S. Application Data

[62] Division of application No. 08/283,918, Aug. 3, 1994, Pat. No. 5,627,343.

[51] Int. Cl.$^7$ ................ B23P 6/00; B23P 11/02
[52] U.S. Cl. .............. 29/402.03; 29/402.08; 29/426.4; 29/426.5; 29/447; 285/381.1; 403/28; 403/273
[58] Field of Search ............... 29/426.1, 426.3, 29/426.4, 426.5, 426.6, 447, 450, 402.03, 402.08; 403/28, 273; 285/381.1, 381.4, 381.5

[56] References Cited

U.S. PATENT DOCUMENTS

| | | |
|---|---|---|
| 2,563,829 | 8/1951 | Fitzgerald et al. . |
| 3,354,742 | 11/1967 | Tschanz et al. ............ 29/450 X |
| 3,423,518 | 1/1969 | Weagant . |
| 3,518,359 | 6/1970 | Trimble et al. . |
| 3,548,079 | 12/1970 | Jones et al. . |
| 3,719,799 | 3/1973 | Takayasu . |
| 3,742,422 | 6/1973 | Rozema et al. . |
| 3,775,828 | 12/1973 | Kopenhaver ............ 29/447 X |
| 3,889,046 | 6/1975 | Oberdiear . |
| 4,126,498 | 11/1978 | Donecker . |
| 4,234,218 | 11/1980 | Rogers . |
| 4,293,178 | 10/1981 | Lee . |
| 4,431,861 | 2/1984 | Clabburn et al. . |
| 4,466,846 | 8/1984 | Nolf et al. . |
| 4,896,904 | 1/1990 | Gadsden et al. . |
| 4,924,034 | 5/1990 | Truesdale et al. . |

FOREIGN PATENT DOCUMENTS

| | | |
|---|---|---|
| 1177915 | 1/1980 | Canada . |
| 20153 | 11/1944 | Finland . |
| 958466 | 3/1950 | France . |
| 2 643 755 | 8/1990 | France . |
| 835 768 | 4/1952 | Germany . |
| 1172418 | 6/1964 | Germany ............... 29/450 |
| 25 40 819 | 3/1977 | Germany . |
| 32 33 939 | 3/1984 | Germany . |
| 2-120586 | 5/1990 | Japan . |
| 184711 | 9/1935 | Switzerland . |
| 2 224 091 | 4/1990 | United Kingdom . |

OTHER PUBLICATIONS

IBM Technical Disclosure Bulletin on Annular Ring Coaxial Termination, pp. 3331–3332.

Military Standardization Handbook on Plastics, Nov. 1, 1965, pp. 76,77.

*Primary Examiner*—Joseph M. Gorski
*Attorney, Agent, or Firm*—Cahn & Samuels, LLP

[57] ABSTRACT

A cable re-entry assembly and method for feedthroughs and the like is provided. The preferred embodiment includes an expansion mandrel positionally secured on the conduit with a heat shrinkable locking ring, a transition boot with a heat shrinkable sleeve portion and a rigid body portion which couples to a feedthrough nut, and a sealant between the conduit and the sleeve. Upon re-entry and re-use of the assembly, the mandrel mechanically expands the sleeve, when the sleeve is re-heated above its crystalline transition temperature, the expansion mandrel is translated against the sleeve and both the conduit and expansion mandrel are withdrawn from the sleeve. Following repair, the conduit is reinserted into the dimensionally unstable sleeve which is then heated to shrink about and reseal the conduit.

9 Claims, 3 Drawing Sheets

RE-ENTERABLE CONDUIT SEALING ASSEMBLY AND METHOD

This application is a divisional of application Ser. No. 08/283,918 filed on Aug. 3, 1994 and now U.S. Pat. No. 5,627,343, which is incorporated entirely herein by reference.

TECHNICAL FIELD

The instant invention relates to conduit feedthrough sealing. More particularly, this invention concerns a re-usable conduit sealing assembly for a bulkhead, junction box, and the like and a method for removal and re-entry of a sealed conduit therefrom.

BACKGROUND OF THE INVENTION

In the conduit sealing arts, many devices or fittings are used for sealing conduits in bulkhead feedthroughs and the like. Conduits such as electrical cables and wires, hydraulic lines, optical fibers, etc. must be passed into various housings, enclosures or machines. Conduit feedthrough fittings are used to prevent both mechanical and environmental damage to a conduit and to provide sealing of the feedthrough. Exemplary of such devices or assemblies are grommets directed to the electrical conduit art for providing hermetic sealing (air and water) to avoid corrosion and physical damage to the conduit.

Conventional sealing conduit feedthrough assemblies historically are one use devices. Commonly, such assemblies are characterized by a tubular male threaded member with a radially projecting flange which is located on the blind side or inside of the feedthrough aperture. A tubular female threaded member, often incorporating a heat shrinkable sleeve forms the second element of the assembly. The female member is translated onto a conduit, the conduit is passed through the male member and therefore, the feedthrough aperture, the male and female members are screwed together. Heat energy is then applied to shrink the sleeve about the conduit. Often, a conduit such as an electrical cable, must be pulled from a feedthrough of a bulkhead such as a junction box for a myriad of reasons and problems, e.g., cracked insulation, fixing a shorted lead, replacing or up-sizing of the pair leads, etc. To remove the cable requires that the conventional sealed feedthrough assembly be cut for removal. Since feedthrough assemblies must be destroyed in the process of removing the conduit, necessarily they are one-time use items. Such conventional feedthrough sealing assemblies cannot be re-used for conduit reentry. The replacement and disposal of such items is not only costly but also produces needless solid waste which is detrimental to the environment.

SUMMARY OF THE INVENTION

It is therefore an object of this invention to overcome the problems of conduit feedthrough re-entry presented by the prior art.

It is another object of this invention to provide an elegant re-enterable conduit assembly and method.

Still another object of this invention is to provide an expedient for a re-enterable cable sealing arrangement for feedthroughs such as junction boxes and the like.

These and other objects are satisfied by a conduit sealing assembly for a feedthrough, comprising:

a) expansion mandrel means for securing about a conduit, said expansion mandrel means having a first end, a second beveled end, and a conduit channel;

b) clamping means for abutting said first end and assisting to positionally secure said expansion mandrel on the conduit; and c) a transition boot generally defining a cylindrical body including a coupling element for securing said transition boot to said feedthrough, and a heat shrinkable sleeve positionable to shrink about the beveled second end of said expansion mandrel.

Still other objects of this invention are satisfied by a method for conduit re-entry into a feedthrough sealed with a conduit assembly including a transition boot with a cylindrical portion coupled to the feedthrough and a dimensionally heat unstable sleeve portion projecting from the cylindrical portion, and an expansion mandrel with a first end, a beveled end seated over a conduit and within the transition boot, and a channel adapted to receive the conduit, the method comprising the steps of:

a) heating the sleeve of the transition boot;

b) pulling the conduit in the direction of the beveled end of the expansion mandrel;

c) mechanically expanding the heated and dimensionally unstable sleeve portion of the transition boot as the boot translates along the conduit;

d) removing the conduit and expansion mandrel from the sleeve;

e) translating the conduit with the lock ring and expansion mandrel through the sleeve and transition boot until the conduit passes through the feedthrough; and f) reheating the dimensionally heat unstable sleeve to shrink the sleeve about the expansion mandrel and reseal the conduit assembly.

In accordance with the instant invention, a conduit sealing assembly and method, particularly useful for electrical cables or wires, hydraulic lines, optical fiber lines, etc., is provided.

The invention calls for the cooperation of the expansion mandrel and the heat shrinkable sleeve of the transition boot to make it possible to re-enter and re-use the existing conduit entry seal assembly. Accordingly, the invention comprises a "Re-enterable Conduit Entry Seal System" or "RECESS™" assembly.

The invention should become clear to the person having ordinary skill in the art upon review of the drawings and the following detailed description thereof.

BEST MODE FOR CARRYING OUT THE INVENTION

Figure 1:
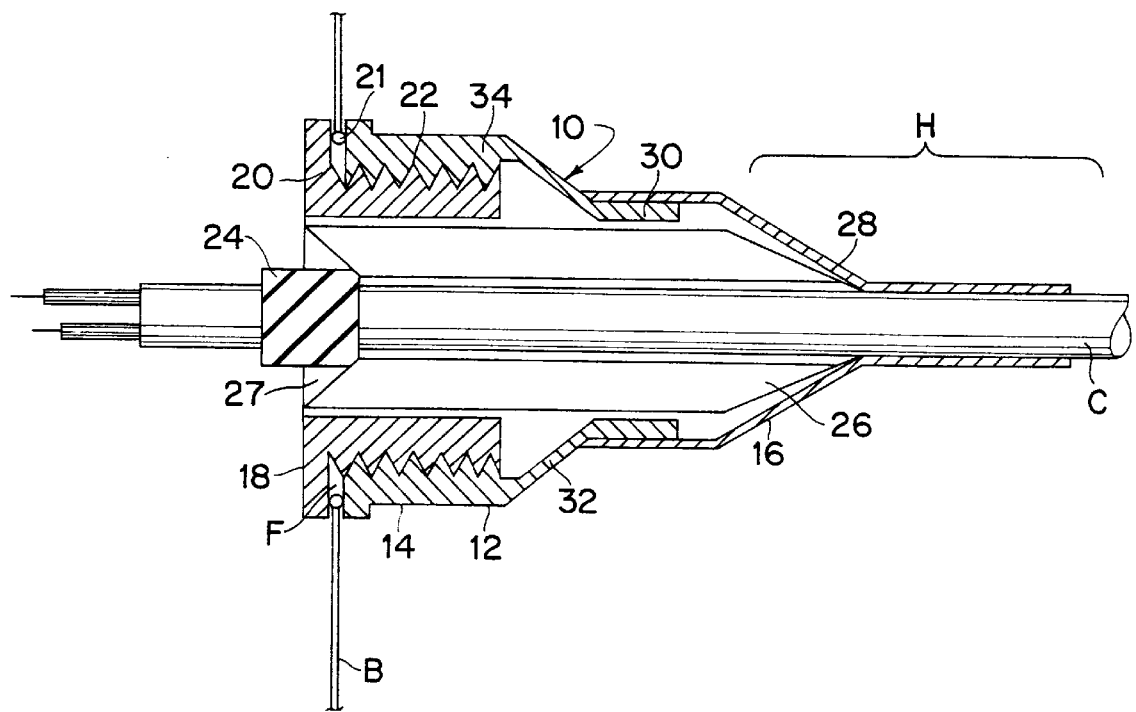
FIG. 1 is a cross-sectional side view of an embodiment of the invention, installed in bulkhead B.

In the preferred embodiment according to the invention, a re-enterable cable assembly 10, as installed with respect to a bulkhead B, is depicted in FIG. 1. For positional reference purposes, as used herein, proximal refers to an element or position near or closest to feedthrough F while distal refers to a comparatively more remote element or position.

The illustrated embodiment of the re-enterable cable assembly 10 includes, as its major constituents: a transition boot/grommet 12 with a molded plastic internally threaded coupling member 14 and a dimensionally heat unstable (shrinkable) sleeve 16; a male feedthrough anchor nut 18 having a male threaded portion 22 and a flange 20 for seating on the blind side of feedthrough F; a locking ring 24; and an expansion mandrel 26 with a beveled face 28.

In order to accomplish re-use and permit conduit reentry, the invention relies on the cooperation between the heat shrinkable sleeve 16 and the expansion mandrel 26, following the preferred procedure detailed below. The expansion mandrel 26, preferably, is formed from machined polytetrafluoroethylene (PTFE), and includes an axial bore of sufficient diameter to accommodate and permit translation of the expansion mandrel over the conduit/cable C. The expansion mandrel 26 also includes a recessed proximal end 27 and a beveled distal end 28 form the respective ends of the expansion mandrel 26.

Figure 3:
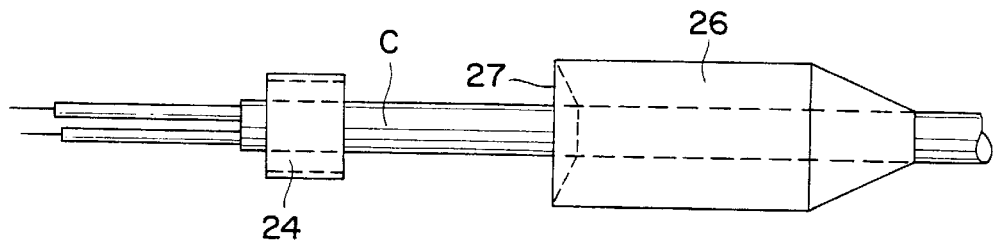
FIG. 3 is a side view representing an initial step of the installation of the expansion mandrel and locking ring of FIG. 1.
Figure 4:
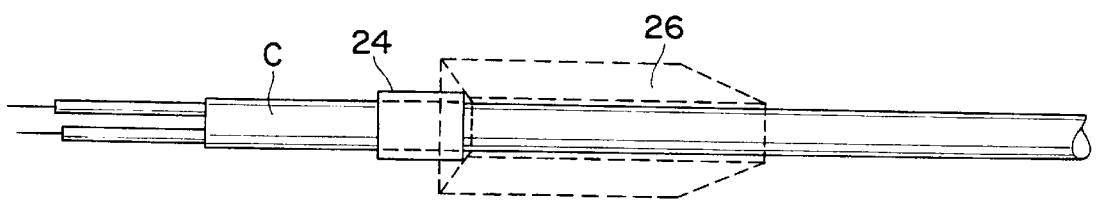
FIG. 4 is a side view representing an intermediate step of the installation of FIG. 1.

As illustrated in FIG. 3, the expansion mandrel 26 is translated over the end of cable C to an appropriate position, i.e., providing an desired length of exposed conduit/cable to pass through bulkhead B. A heat shrinkable locking ring 24 is then translated over the end of cable C into an abutting position with the recessed proximal end 27. (See FIG. 4.)

The heat shrinkable locking ring 24, preferably, is formed from conventional expanded, heat shrinkable tubing cut to a length of between ½ to 1 inch. The tubing is formed of, for example, thermoplastic or elastomeric, cross-linked polyolefins such as polyethylene, EVA (ethylvinyl acetate), EPDM (ethylene propylene diene monomer), etc. or blends and mixtures thereof. The inner diameter of the locking ring 24, as the diameter of the axial bore of expansion mandrel 26, must exceed the outer diameter of the conduit/cable C. Thus, in the present embodiment, the outer diameter of the locking ring 24 should not exceed the outer diameter of the expansion mandrel 26, and preferably, is intermediate to the outer and inner diameters of the annulus defined by the expansion mandrel 26 to nest within the recessed proximal end 27.

Following the preferred procedure, after positioning the expansion mandrel 26 and the locking ring 24 on the conduit/cable C, heat, in the form of radiant energy, is applied. The heat must be in a sufficient amount to exceed the crystalline transition temperature of the material composing the locking ring 24. Preferably, that temperature is well below a temperature at which the conduit or cable would sustain damage and the selection of the composition of locking ring 24 should be made in consideration of this factor.

Figure 5:
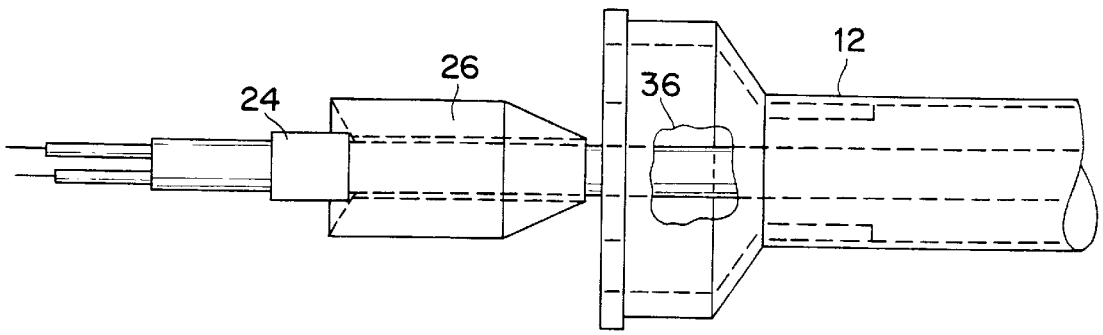
FIG. 5 is a side view representing a subsequent step of the installation of FIG. 1.

The application of heat induces dimensional instability and causes expanded locking ring 24 to shrink about and clamp onto the conduit C resulting in positionally fixing the proximal end of the expansion mandrel to the conduit C. It is important that enough heat be applied so that the locking ring clamps tightly onto a conduit and bites the conduit or conduit jacketing. This ensures that the locking ring will not dislodge and expansion mandrel 26 cannot slide proximally relative to the conduit C when a pulling force is applied to the conduit/cable C. Also, since precise registry of the inner diameter of the expansion mandrel 26 and the outer diameter of conduit C should not be expected, prior to the locking ring cooling, i.e., before the temperature falls below the crystalline transition temperature, the expansion mandrel 26 should be pressed against the softened locking ring 24 with sufficient lateral pressure so that the locking ring 24 extrudes into any clearance between the expansion mandrel 26 and the cable C. The locking ring 24 is then allowed to cool in this position. The result of forcing the softened plastic between the expansion mandrel 26 and the conduit/cable C, as illustrated in FIG. 5, eliminates problems associated with varying tolerances between the expansion mandrel and the conduit.

Figure 2:
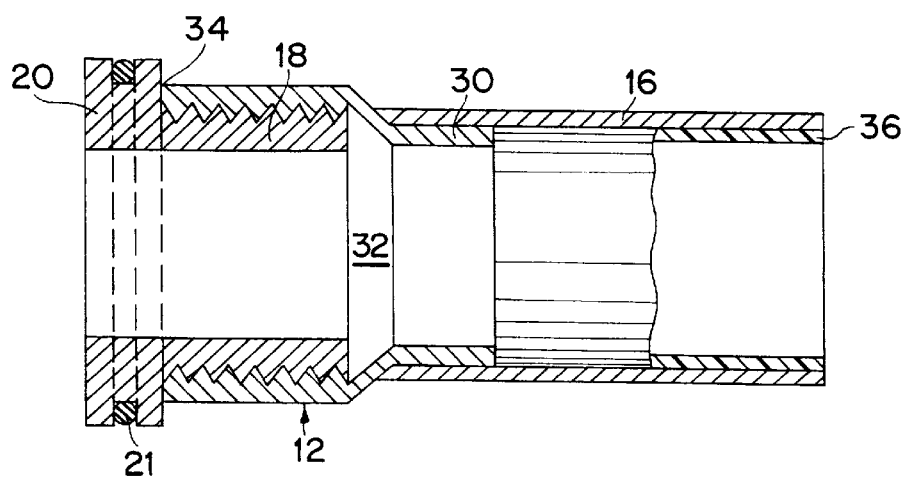
FIG. 2 is a cross-sectional side view of the transition body and feedthrough nut of FIG. 1 coupled together.

Following the preferred procedure above, the conduit C is now prepared for application of the transition boot 12. The transition boot 12 has an inner diameter greater than the outer diameter of the expansion mandrel 26 so that in the unshrunken, dimensionally unstable state illustrated in FIG. 2, it is able to be translated over the conduit end and the expansion mandrel 26. (See FIG. 5). The conduit/cable end is passed through feedthrough F and the transition boot 12 is screwed to the feedthrough anchor nut 18.

The transition boot 12, in the illustrated embodiment of the invention, is a unitary structure including a heat shrinkable sleeve 16 and a proximal, molded, hard plastic (e.g., polyester or nylon resin) body portion 14. The body portion 14 includes ring portion 30 which is sized to be in substantial registry with the outer diameter of the expansion mandrel 26 to thereby journal the expansion mandrel. A flaring portion 32 connects the ring portion 30 with the internally threaded, female flanged portion 34 having an inner diameter greater than the outer diameter of the expansion mandrel 26. The female flanged portion 34, therefore, can mate with the male threaded portion 22 of feedthrough nut 18. Furthermore, the female flanged portion 34 is dimensioned to be larger than the feedthrough F. In the illustrated embodiment, the outer diameter of the flange portion 34 is equal to that of the flange 20 of nut anchor 18.

The feedthrough anchor nut 18 is dimensioned to correspond with the feedthrough F. The feedthrough nut 18 includes a flange 20, the radius of which is greater than feedthrough F, and an externally threaded male portion 22 dimensioned to pass through the feedthrough F. The purpose of feedthrough nut 18 is to secure transition boot 12 to form a uniform channel through bulkhead B. Accordingly, the feedthrough nut 18 is of sufficient length not only to seat against the blind side of and extend through feedthrough F but also to project from the bulkhead B enough to permit secure coupling with the transition boot 12.

The feedthrough anchor nut 18 preferably is formed from non-electrically conductive, rigid plastic of the same type as the body portion 14, e.g., polyester and defines a male threaded member configured to mate with the female threaded member of the transition boot 12. The threaded portions cooperate to couple the transition boot to the feedthrough nut and to establish a feedthrough grommet for conduit C.

An O-ring 21 is used to seal the connection between the transition boot 12 and the feedthrough nut 18 with respect to the bulkhead B. The O-ring 21 also reduces the susceptibility of the connection to loosening or damage resulting from, for example, vibrational forces.

The distal end of the transition boot 12 constitutes heat shrinkable sleeve 16 which, in the illustrated embodiment, is permanently secured about the ring portion 30 with adhesive, e.g. cyanoacrylate adhesives. Conventional mechanical fastening devices such as ring clamps may also be used. The heat shrinkable sleeve 16 is formed from conventional elastomeric or thermoplastic, cross-linked polyolefins such as those described above with reference to the locking ring 24. The heat shrinkable sleeve, as illustrated in FIG. 1 and designated by region H, is in a shrunken or more dimensionally heat stable condition than the initial configuration illustrated in FIG. 2 which depicts a less dimensionally heat stable condition.

The process of heat shrinking the sleeve involves application of enough heat to exceed the crystalline transition temperature of the cross-linked polyolefin. Once that temperature is exceeded the crystalline structure breaks down and the sleeve reverts to a more dimensionally stable, lower energy configuration, i.e., shrinks. It is preferred that a layer 36 of thermally reversible adhesive sealant be coated onto the inner circumferential surface of sleeve 16 which shrinks about the conduit C. The material comprising adhesive sealant layer 36 should have a melting point equal to or less than the crystalline transition temperature of the sleeve 16. A mixture of EVA and polyamide has been found to provide satisfactory results. The layer 36 will melt and flow during heat application with radiant energy, electrical heating or the like. As the sleeve 16 shrinks about the conduit C, the fluid adhesive layer flows into and seals any gaps therebetween. Upon cooling, the layer 36 solidifies and seals the shrunken sleeve 16 to the conduit C.

Summarizing the preferred initial application of the assembly, in accordance with the illustrated embodiment, it includes the steps of: 1) sliding the expansion mandrel over the end of the conduit; 2) translating the locking ring over the conduit to a desired position; 3) heating the locking ring to shrink it about the conduit; 4) pressing the expansion mandrel against the softened locking ring; 5) allowing the locking ring to cool; 6) sliding the transition boot over the cable end and the expansion mandrel; 7) securing the feedthrough nut in the bulkhead; 8) screwing the transition boot to the bulkhead; and 9) heating the transition boot sleeve to liquify the internal sealant layer and to cause the sleeve to shrink about the beveled, distal end 28 of the mandrel 26 and seal the conduit C.

Figure 6:
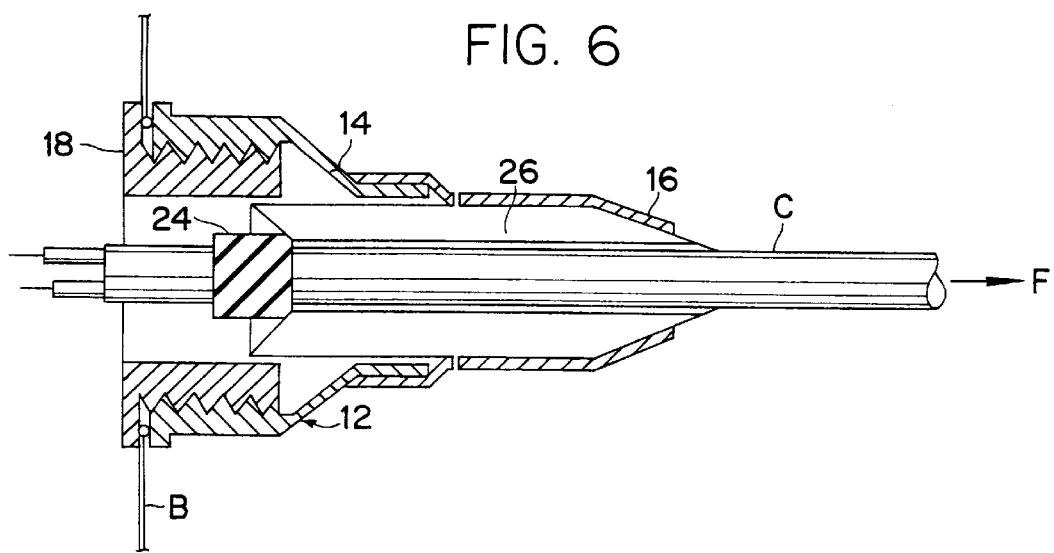
FIG. 6 is a cross-sectional side view representing the position of the assembled components at the commencement of the re-entry procedure of the invention.
Figure 7:
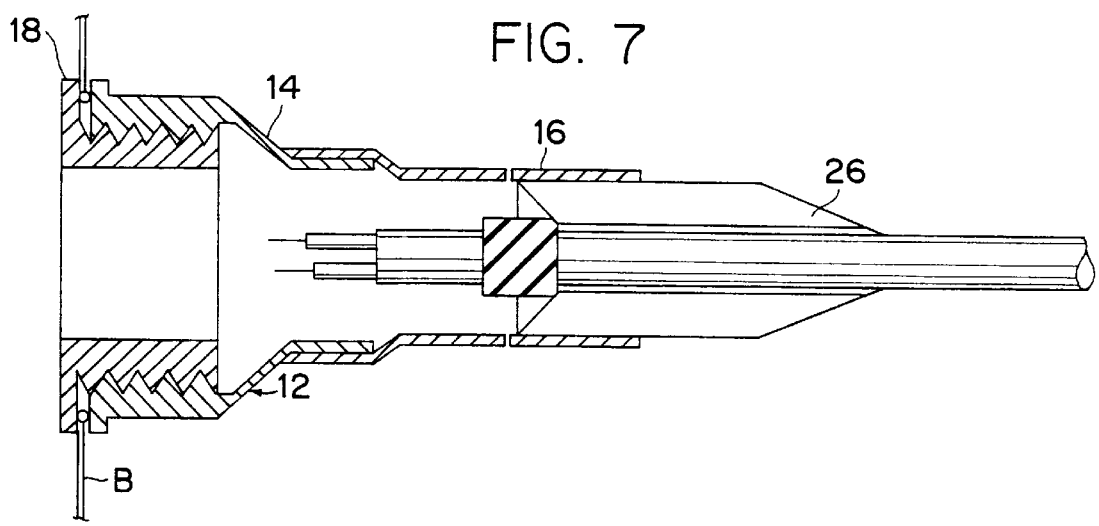
FIG. 7 is a cross-sectional side view representing a subsequent step of the re-entry procedure of the invention.
Figure 8:
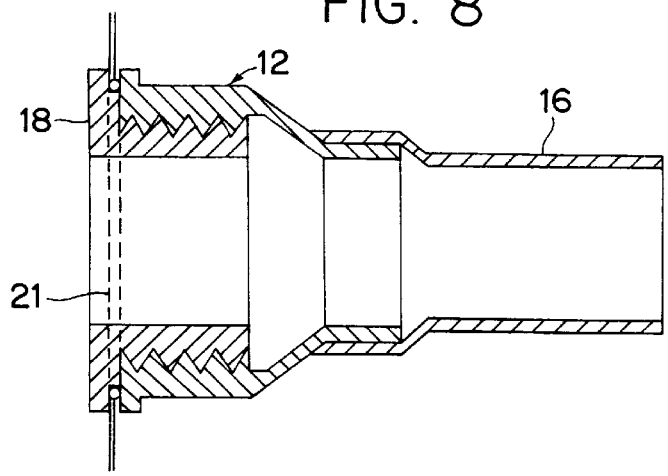
FIG. 8 is a cutaway side view of the transition boot and feedthrough nut prepared for reentry.

Moving now to another significant aspect of the invention, assembly 10 allows for re-entry and reuse as a bulkhead conduit seal. This capability is primarily attributable to the cooperation of the combination of the expansion mandrel 26 and heat shrinkable sleeve 16. To remove the conduit from the secured assembly, first the conduit is freed from inside or the blind side of the bulkhead. Then the transition boot sleeve 16 is heated for a sufficient time to raise the sleeve temperature in heating zone H above the crystalline transition temperature of the sleeve. With careful application of heat from a flame source, this heating step can take up to a few minutes. Once the heat shrinkable sleeve 16 of the transition boot 12 softens, i.e., the temperature exceeds the crystalline transition temperature of the polyolefin which in turn exceeds the melt temperature of the sealant 36, the conduit is pulled in a distal direction (away from the bulkhead B) as illustrated in FIGS. 6 and 7. The distally directed force urges the beveled mandrel face 28 against the inner diameter of the sleeve 16 to mechanically expand the heated, dimensionally heat unstable sleeve. It is suggested that heating be discontinued and that the expansion mandrel 26 remain in contact with sleeve 16 for a brief time until the sleeve 16 cools to a temperature below its crystalline transition temperature. After such cooling, the conduit is freed from the deformed, expanded sleeve as depicted in FIG. 8, by using a circular twisting motion while pulling.

During the sleeve expansion process, the outer edge of the beveled end 28 also acts as a squeegee or doctor blade to collect the re-liquified sealant 36 from the inner wall of the sleeve 16. The residual sealant 36 remaining on the beveled end 28 of the expansion mandrel 26, can be removed before re-solidification or after re-solidification by mechanical wiping of the expansion mandrel 26. As a result of the foregoing, the transition boot 12 is in a condition for re-use.

After repair, etc. of conduit C, the clamped mandrel/conduit sub-assembly is reinserted through the transition boot 12 and the transition boot heated to re-seal the cable entry. Substantially according to the procedures outlined with respect to initial installation. However, since the sealant 36 was substantially eliminated during the removal procedure, it is recommended that a dab of or tape formed from the EVA/polyamide adhesive/sealant be applied. Preferably, the EVA/polyamide adhesive/sealant is in the form of an extruded strip or tape formed on release paper. The tape can be conveniently applied by spiral wrapping of the conduit in the area just distal to the beveled face 28 of the expansion mandrel. Use of sealant tape, particularly if spirally wound onto conduit C, insures a water-tight seal once the electrical cable is installed.

In the event the conduit must be replaced or subject to an operation requiring the removal of the expansion mandrel 26, the expansion mandrel and a new locking ring 24 should be positioned proximate to the new conduit end. In this case, all components except the sealant tape and the locking ring can be reused in the assembly procedure outlined above.

Certain variations of the foregoing preferred embodiment should be readily apparent. For example, the feedthrough connection can be established by direct compression fitting the body portion 14 with feedthrough F in lieu of the above-described nut and O-ring connection. Compression fitting can be achieved by use of PTFE tape wrapped around the body portion projecting into feedthrough F. The body portion, in such a case, preferably possesses external threads to permit it to be screwed directly into the feedthrough F.

In the illustrated embodiment, the feedthrough anchor nut defines a male feedthrough portion which couples to the female transition boot portion. The male and female coupling members can be easily reversed. Alternative functional equivalents to threaded coupling members, such as snap fit connectors or other conventional reversible connecting structures are readily employable for the transition nut and feedthrough anchor in this invention. Also, the illustrated embodiment shows a circular feedthrough. This invention, however, is readily adapted to polygonal or other cross-sectional geometries.

Furthermore, the embodiment illustrated is for a single conduit feedthrough. The invention is readily adapted for a re-enterable feedthrough system for multiple conduits. Indeed, the advantages of the invention's re-enterable capability are magnified since the need to change one conduit will not require refitting all of the conduits with a new multiple feedthrough assembly.

The sleeve 16, may also incorporate wires for connection to a electrical power source for direct resistive heating or the sleeve may include metal elements (strips, wires, particles, etc.) for inductive heating of the sleeve to induce shrinking and sealant liquification.

Given the foregoing, variations and modifications to the invention should now be apparent to a person having ordinary skill in the art. These variations and modifications are intended to fall within the scope and spirit of the invention as defined by the claims following the description of industrial applicability.

Industrial Applicability

This invention has great utility as a re-enterable conduit bulkhead feedthrough assembly. This invention reduces waste associated with engineering plastics used in bulkhead feedthroughs by providing a reusable assembly. This invention is particularly suitable for use as a sealing feedthrough associated with electrical cabling and junction boxes, hydraulic lines passing through bulkheads, and optical fiber conduits.

What is claimed is:

1. A method of conduit re-entry, comprising the steps of:

providing a feedthrough defining an opening;

providing a transition boot having a cylindrical portion and a heat shrinkable sleeve portion projecting axially from the cylindrical portion, wherein the cylindrical portion and the sleeve portion define an opening and the sleeve portion becomes dimensionally heat unstable upon being heated above its crystalline transition temperature;

providing an expansion mandrel of a select diameter with a first end, a beveled second end, and an opening interconnecting the first end with the second end;

providing a conduit;

assembling said feedthrough, said transition boot, said expansion mandrel and said conduit with one another such that said opening of said transition boot becomes axially aligned with said opening of said feedthrough, said conduit is received within said opening of said expansion mandrel and becomes attached thereto, said conduit and said expansion mandrel are received within said aligned openings of said feedthrough and said transition boot, and said sleeve portion becomes heat shrunk onto said conduit;

heating said sleeve portion to a temperature above its crystalline transition temperature, thereby rendering said sleeve portion dimensionally heat unstable; then pulling said conduit in the direction of said beveled end of said expansion mandrel, thereby causing said expansion mandrel to pass through said aligned openings of said feedthrough and said transition boot such that said beveled end forces said sleeve portion to expand to said select diameter, while said sleeve portion remains dimensionally heat unstable cooling said sleeve portion such that said sleeve portion maintains said selected diameter; then continuing pulling said conduit until said conduit and said expansion mandrel are completely removed from said aligned openings of said feedthrough and said transition boot; then passing a conduit and an attached expansion mandrel as a unit through said aligned openings of said feedthrough and said transition boot; and then re-heating said sleeve portion to a temperature above its crystalline transition temperature, thereby causing said sleeve portion to shrink from said select diameter to a diameter substantially corresponding to that of an outer surface of said conduit such that said sleeve portion seals around said conduit.

2. The method according to claim 1, wherein said conduit becomes attached to said expansion mandrel as a result of said assembly step by performing the following steps:

providing a heat shrinkable locking ring;

positioning said shrinkable locking ring around said conduit and in abutting relationship with said first end of said expansion mandrel; and then heating said heat shrinkable locking ring, thereby causing said heat shrinkable locking ring to shrink about and clamp onto said conduit, whereby said conduit becomes attached to said expansion mandrel.

3. The method according to claim 1, wherein said passing step includes passing through said aligned openings of said feedthrough and said transition boot the conduit that was removed from said aligned openings of said feedthrough and said transition boot as a result of said pulling step.

4. The method according to claim 2, wherein said heating step causes said heat shrinkable locking ring to irreversibly clamp onto said conduit.

5. The method according to claim 1, wherein said providing a transition boot step further includes providing the transition boot with an internally threaded portion, such that said cylindrical portion is located axially between said heat shrinkable sleeve portion and said internally threaded portion; and the method further including the steps of:

providing an externally threaded feedthrough nut anchor attached to and extending through said feedthrough, wherein said assembly step includes mating the internal threads of said transition boot with the external threads of said feedthrough nut anchor such that said transition boot becomes attached to said feedthrough via said nut anchor; and removing said transition boot from said feedthrough by unthreading said transition boot from said nut anchor.

6. The method according to claim 1, and further comprising the step of applying a sealant between said sleeve portion and said conduit, such that said sealant causes said sleeve portion to seal about said conduit as a result of said re-heating step.

7. The method according to claim 6, wherein said step of applying a sealant includes the steps of:

providing a strip of sealant formed from a blend of EVA and polyamide, said strip being substantially flowable at a temperature below said crystalline transition temperature of said sleeve portion; and wrapping said strip around said conduit between said sleeve portion and said conduit.

8. A method of conduit re-entry, comprising the steps of:

providing a feedthrough defining an opening;

providing a transition boot having a cylindrical portion and a heat-shrinkable sleeve portion projecting axially from the cylindrical portion, wherein the cylindrical portion and the sleeve portion define an opening and the sleeve portion becomes dimensionally heat unstable upon being heated above its crystalline transition temperature;

providing an expansion mandrel of a select diameter with a first end, a beveled second end, and an opening interconnecting the first end with the second end;

providing a conduit;

providing a lock ring;

assembling said feedthrough, said transition boot, said expansion mandrel, said conduit and said lock ring with one another such that said opening of said transition boot becomes axially aligned with said opening of said feedthrough, said conduit is received within said opening of said expansion mandrel, said conduit and said expansion mandrel are received within said axially aligned openings of said feedthrough and said transition boot, said sleeve portion becomes heat shrunk onto said conduit, and said lock ring surrounds and becomes secured to said conduit while abutting said first end of said expansion mandrel;

heating said sleeve portion to a temperature above its crystalline transition temperature, thereby rendering said sleeve portion dimensionally heat unstable; then pulling said conduit in the direction of said beveled end of said expansion mandrel, thereby causing said lock ring and expansion mandrel to pass through said aligned openings of said feedthrough and said transition boot such that said beveled end forces said sleeve portion to expand to said select diameter, while said sleeve portion remains dimensionally heat unstable; then cooling said sleeve portion such that said sleeve portion maintains said select diameter; then continuing pulling said conduit until said conduit and said expansion mandrel are completely removed from said aligned openings of said feedthrough and said transition boot; then passing a conduit and an attached expansion mandrel as a unit through said aligned openings of said feedthrough and said transition boot; and then re-heating said sleeve portion to a temperature above its crystalline temperature, thereby causing said sleeve portion to shrink from said select diameter to a diameter substantially corresponding to that of an outer surface of said conduit such that said sleeve portion seals around said conduit.

9. The method according to claim 7, wherein said step of providing a lock ring comprises providing a heat shrinkable lock ring, and wherein said assembly step includes positioning said heat shrinkable lock ring around said conduit and in abutting relationship with said first end of said expansion mandrel and then heating said heat shrinkable lock ring, thereby causing said heat shrinkable lock ring to shrink about and clamp onto said conduit.

* * * * *